United States Patent
Miyajima et al.

(10) Patent No.: US 9,783,367 B2
(45) Date of Patent: Oct. 10, 2017

(54) CONVEYOR BELT

(71) Applicant: The Yokohama Rubber Co., LTD., Minato-ku, Tokyo (JP)

(72) Inventors: Atsushi Miyajima, Hiratsuka (JP); Ryotaro Suefuji, Hiratsuka (JP); Hidehiro Sasakuma, Hiratsuka (JP); Gang Hou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 107 days.

(21) Appl. No.: 14/423,423

(22) PCT Filed: Aug. 23, 2013

(86) PCT No.: PCT/JP2013/072585
§ 371 (c)(1),
(2) Date: Feb. 23, 2015

(87) PCT Pub. No.: WO2014/030747
PCT Pub. Date: Feb. 27, 2014

(65) Prior Publication Data
US 2015/0232276 A1    Aug. 20, 2015

(30) Foreign Application Priority Data
Aug. 23, 2012  (JP) .................. 2012-183874

(51) Int. Cl.
*B65G 15/36*    (2006.01)
*B65G 15/32*    (2006.01)
(Continued)

(52) U.S. Cl.
CPC ............ *B65G 15/36* (2013.01); *B65G 15/32* (2013.01); *B60C 9/18* (2013.01); *B60C 9/20* (2013.01); *B65G 2812/02207* (2013.01)

(58) Field of Classification Search
CPC .................. B65G 15/36; B65G 15/32; B65G 2812/02207; B60C 9/18; B60C 9/20
(Continued)

(56) References Cited

U.S. PATENT DOCUMENTS 5,512,626 A * 4/1996 Matsuo et al. ............. 152/209.5
5,595,284 A * 1/1997 Takahashi et al. ........... 198/847
(Continued)

FOREIGN PATENT DOCUMENTS

| CN | 1068309 | 1/1993 |
| DE | 1184275 | 12/1964 |

(Continued)

OTHER PUBLICATIONS

International Search Report for International Application No. PCT/JP2013/072585 dated Nov. 26, 2013, 4 pages, Japan.

*Primary Examiner* — Leslie A Nicholson, III
(74) *Attorney, Agent, or Firm* — Thorpe North & Western

(57) ABSTRACT

A conveyor belt includes a core layer disposed between an upper cover rubber layer and a lower cover rubber layer. The core layer is configured from a plurality of steel cords covered by cushioning rubber and arranged in parallel. The rubber that forms the lower cover rubber layer is a low loss rubber that has a loss factor tanδ of 0.07 or less at a frequency of 10 Hz, 2% dynamic strain, and temperature of 20° C. The maximum thickness of the cushioning rubber is reduced to not more than ⅓ the nominal diameter of the steel cords.

2 Claims, 6 Drawing Sheets

(51) Int. Cl.
*B60C 9/20* (2006.01)
*B60C 9/18* (2006.01)

(58) Field of Classification Search
USPC ................................. 198/844.1, 846, 847
See application file for complete search history.

(56) References Cited

U.S. PATENT DOCUMENTS

| | | | |
|---|---|---|---|
| 7,060,341 B2* | 6/2006 | Mima et al. | 428/162 |
| 2007/0144650 A1* | 6/2007 | Tsuda | 152/537 |
| 2012/0152428 A1* | 6/2012 | Kouno et al. | 152/526 |
| 2015/0114539 A1* | 4/2015 | Fudemoto et al. | 152/537 |

FOREIGN PATENT DOCUMENTS

| | | |
|---|---|---|
| DE | 3012879 | 10/1981 |
| JP | 59182109 A * | 10/1984 |
| JP | 05139516 A * | 6/1993 |
| JP | 07267318 A * | 10/1995 |
| JP | H11-139523 | 5/1999 |
| JP | 2008-038133 | 2/2008 |
| JP | 2009-040604 | 2/2009 |
| JP | 2009-275781 | 11/2009 |
| WO | WO/2008007733 | 1/2008 |
| WO | WO/2009139160 | 11/2009 |

\* cited by examiner

CONVEYOR BELT

TECHNICAL FIELD

The present technology relates to a conveyor belt, and particularly relates to a conveyor belt that can further reduce running resistance caused by the belt traveling over support rollers.

BACKGROUND

In recent years, conveyor belts with energy saving specifications which can reduce the power consumption of motors for driving belts have become widespread. In such conveyor belts with energy saving specifications, a low loss rubber, rubber with a small value of a loss factor tan$\delta$ which is an energy loss index, is used as a rubber which forms a lower cover rubber layer that comes in contact with support rollers (for example, see Japanese Unexamined Patent Application Publication No. H11-139523A). The loss factor tan$\delta$ is a value calculated from E"/E' using a storage elastic modulus E' and a loss elastic modulus E" of the rubber. The smaller the value of the loss factor tan$\delta$, the smaller the amount of energy dissipated as heat when the rubber is deformed (the smaller the energy loss).

When the low loss rubber with a small loss factor tan$\delta$ value is used as the rubber which forms the lower cover rubber layer, it is possible to reduce the rubber deformation when the running conveyor belt travels over the support rollers and to reduce the running resistance. Therefore, the energy loss when the conveyor belt is running is reduced, which contributes to power saving in the motor for driving the belt.

As illustrated in FIG. 6, in a case of a conveyor belt 11 with steel cords 3 as a core, a core layer 2 which is disposed between the upper cover rubber layer 5 and the lower cover rubber layer 6 is configured by covering and embedding a large number of the steel cords 3 arranged in parallel in the belt width direction by a cushioning rubber 4. Ear rubbers 7 are disposed at both ends in the belt width direction. The cushioning rubber 4 is an adhesive rubber used in order to favorably adhere the steel cords 3 to the upper cover rubber layer 5 and the lower cover rubber layer 6 and a thickness t of the cushioning rubber 4, that is, the maximum thickness, is thicker than the nominal diameter of the steel cords 3.

When the rubber deformation when the conveyor belt travels over the support rollers was analyzed in detail, it was found that the cushioning rubber was also deformed in addition to the rubber of the lower cover rubber layer and this deformation was one cause of running resistance. However, there are strict constraints on the blend for the cushioning rubber since it is necessary to prioritize the adhesion between the steel cords and the upper cover rubber layer and the lower cover rubber layer. Therefore, it is difficult to set the blend of the cushioning rubber such that the loss factor tan$\delta$ is simply reduced, which is an obstacle to reducing the running resistance when traveling over the support rollers.

SUMMARY

The present technology is to provide a conveyor belt that can further reduce running resistance during belt operation caused by traveling over support rollers.

A conveyor belt of the present technology includes a core layer disposed between an upper cover rubber layer and a lower cover rubber layer, the core layer being configured from a plurality of steel cords covered by cushioning rubber and arranged in parallel, wherein a low loss rubber that has a loss factor tan$\delta$ of 0.07 or less at a frequency of 10 Hz, 2% dynamic strain, and temperature of 20° C. is used as a rubber that forms the lower cover rubber layer, and a maximum thickness of the cushioning rubber is not more than ⅓ a nominal diameter of the steel cords.

According to the present technology, in addition to using a low loss rubber having a loss factor tan$\delta$ of 0.07 or less as the rubber which forms the lower cover rubber layer which comes in contact with support rollers, the maximum thickness of the cushioning rubber is not more than ⅓ the nominal diameter of the steel cords. Since the thickness (the maximum thickness) of the cushioning rubber in the conventional art is thicker than the nominal diameter of the steel cords, it is possible to significantly reduce the volume of the cushioning rubber in the present technology. Therefore, it is possible to further reduce the running resistance during belt operation since it is possible to reduce the influence of cushioning rubber for which it is difficult to adjust the loss factor tan$\delta$ of.

Here, it is also possible to set a specification where the adjacent steel cords of the core layer are linked using the cushioning rubber. According to this specification, it is possible to simplify the steps of manufacturing the core layer since it is possible to manufacture the core layer using a sheet material of the rubber which forms the cushioning rubber.

For example, it is also possible to set a specification where the thickness of the cushioning rubber which covers the outer circumferential surfaces of the steel cords is thinner than the thickness of the cushioning rubber between the adjacent steel cords. According to this specification, it is possible to further simplify the steps of manufacturing the core layer since it is possible to manufacture the core layer using a sheet material with a predetermined thickness of the rubber which forms the cushioning rubber. In addition, there is an advantage in manufacturing a stable core layer with little variation in the thickness of the cushioning rubber with high productivity.

It is also possible to set a specification where the thickness of the cushioning rubber which covers the outer circumferential surfaces of the steel cords is the same as the thickness of the cushioning rubber between the adjacent steel cords. According to this specification, there is an advantage in achieving uniform adhesive power without variation between the steel cords and the upper cover rubber layer and the lower cover rubber layer.

It is also possible to set a specification where the rubber which forms the lower cover rubber layer is interposed between the adjacent steel cords without interposing the rubber which forms the upper cover rubber layer.

According to this specification, there is an advantage in reducing the running resistance during belt operation since it is possible to increase the volume ratio of the low loss rubber which forms the lower cover rubber layer.

Alternatively, it is also possible to set a specification where the rubbers which form the upper cover rubber layer and the lower cover rubber layer are interposed between the adjacent steel cords without linking the adjacent steel cords of the core layer using the cushioning rubber. According to this specification, there is an increased advantage in reducing the running resistance during belt operation since it is possible to set the volume of the cushioning rubber to the minimum necessary.

The nominal diameter of the steel cord is, for example, approximately from 2.5 mm to 12.0 mm. Since steel cords with such a thickness are widely used as constituent members of a core layer, there is a benefit to using the present technology.

BRIEF DESCRIPTION OF THE DRAWING(S)

DETAILED DESCRIPTION

Figure 1:
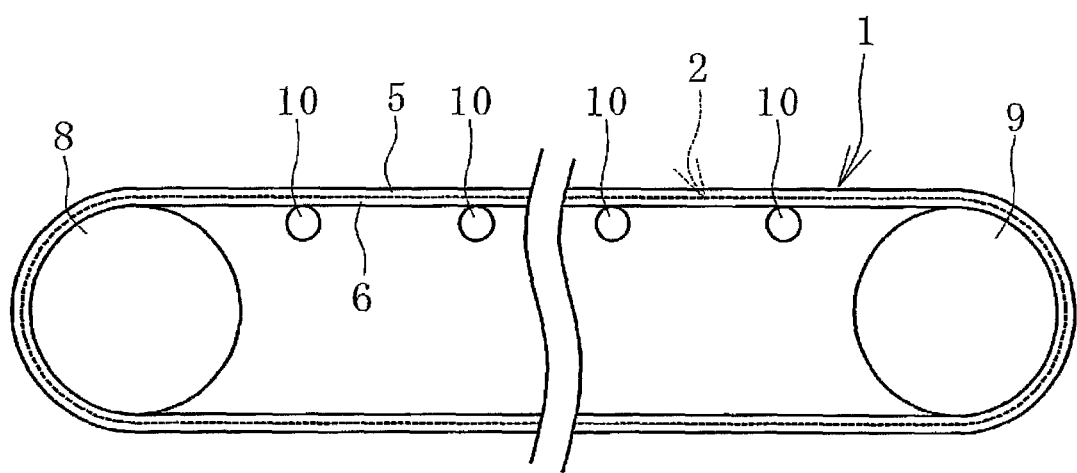
FIG. 1 is an explanatory view illustrating a state where a conveyor belt of the present technology is stretched.

Below, description will be given of the conveyor belt of the present technology based on embodiments illustrated in the drawings.

Figure 2:
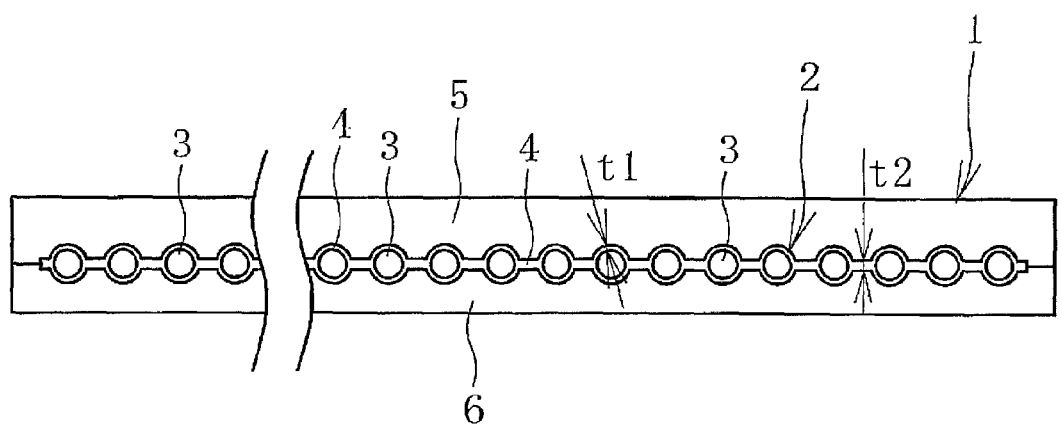
FIG. 2 is a side cross-sectional view of the conveyor belt of FIG. 1.

A conveyor belt 1 of the present technology illustrated in FIG. 1 and FIG. 2 is stretched between a driving pulley 8 and a driven pulley 9 of a belt conveyor apparatus. A multiplicity of support rollers 10 is disposed between the driving pulley 8 and the driven pulley 9 and these support rollers 10 come in contact with a lower cover rubber layer 6. A core layer 2 is a member which bears the tension when the conveyor belt 1 is stretched.

One core layer 2 is disposed between the upper cover rubber layer 5 and the lower cover rubber layer 6. The core layer 2 is configured by a large number of the steel cords 3, which extend in parallel in the belt length direction at intervals in the belt width direction, and the cushioning rubber 4 which covers these steel cords 3. The number and thickness of the steel cords 3 which are the core are determined according to the properties (rigidity, elongation, and the like) demanded with respect to the conveyor belt 1. The nominal diameter of the steel cords 3 is, for example, approximately from 2.5 mm to 12.0 mm. The intervals between adjacent steel cords 3 are, for example, approximately from 8 mm to 25 mm. A reinforcing layer is embedded in the conveyor belt 1 as necessary.

The rubber which forms the upper cover rubber layer 5 is appropriately determined mainly according to the objects which are transported by the conveyor belt 1. This rubber is exemplified by natural rubber, synthetic rubber, and the like used in a conventional conveyor belt 11.

The rubber which forms the lower cover rubber layer 6 is a low loss rubber with a loss factor tanδ of 0.07 or less at a frequency of 10 Hz, 2% dynamic strain, and temperature of 20° C. As the rubber which forms the lower cover rubber layer 6, natural rubber, synthetic rubber, and the like are specifically exemplified.

The thickness of the upper cover rubber layer 5 is, for example, from 1.5 mm to 30 mm, the thickness of the lower cover rubber layer 6 is, for example, from 1.5 mm to 20 mm, and the thickness of the upper cover rubber layer 5 is often not less than the thickness of the lower cover rubber layer 6.

As the rubber which forms the cushioning rubber 4, natural rubber, synthetic rubber, and the like used in the conventional conveyor belt 11 are exemplified. In this embodiment, a thickness t2 of the cushioning rubber 4 between the adjacent steel cords 3 is the maximum thickness and the thickness t2 is not more than ⅓ the nominal diameter of the steel cords 3.

The lower limit value of the thicknesses t1 and t2 of the cushioning rubber 4 is a thickness at which it is possible to preserve the adhesive power at a fixed level between the steel cords 3 and the upper cover rubber layer 5 and the lower cover rubber layer 6, for example, approximately ¹/₁₀ the nominal diameter of the steel cords 3 or approximately 1.0 mm.

In the embodiment illustrated in FIG. 2, the adjacent steel cords 3 which configure the core layer 2 are linked by the cushioning rubber 4. Then, the thickness t1 of the cushioning rubber 4 which covers the outer circumferential surfaces of the steel cords 3 is thinner than the thickness t2 of the cushioning rubber 4 between the adjacent steel cords 3. For example, the thickness t1 is approximately 50% of the thickness t2.

Figure 3:
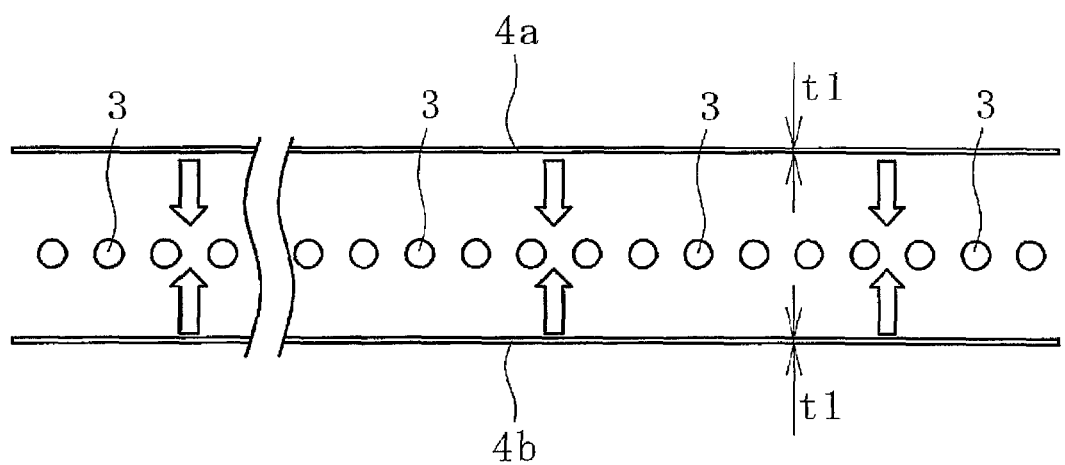
FIG. 3 is an explanatory view illustrating a manufacturing step of a core layer of FIG. 1.

In the manufacturing of the core layer 2, as illustrated in FIG. 3, a large number of the steel cords 3 which are aligned in parallel are interposed from above and below between sheet material of cushioning rubbers 4a and 4b with the thickness t1. Due to this, the core layer 2, in which the steel cords 3 are covered by the cushioning rubber 4 and the thickness t1 of the cushioning rubber 4 which covers the outer circumferential surfaces of the steel cords 3 is thinner than the thickness t2 of the cushioning rubber 4 between the adjacent steel cords 3, is manufactured. It is possible to manufacture the conveyor belt 1 by performing a normal vulcanization step after setting the core layer 2 to be interposed from above and below between the rubber which forms the upper cover rubber layer 5 and the rubber which forms the lower cover rubber layer 6 respectively.

In this manner, in the present technology, by adopting a low loss rubber with a loss factor tanδ of 0.07 or less as the rubber which forms the lower cover rubber layer 6, the energy loss is reduced when operating the conveyor belt 1 by reducing the running resistance when the conveyor belt 1 travels over the support rollers 10. Then, in addition to adopting the low loss rubber, the thickness t2 (the maximum thickness) of the cushioning rubber 4 is set to not more than ⅓ the nominal diameter of the steel cords 3.

Figure 6:
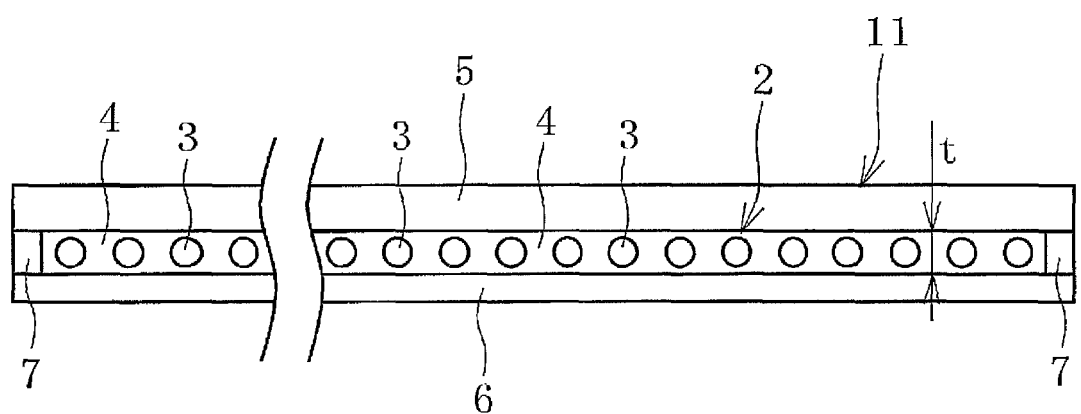
FIG. 6 is a side cross-sectional view illustrating a conveyor belt of the conventional art.

As illustrated in FIG. 6, the thickness (the maximum thickness) t of the cushioning rubber 4 which constitutes the core layer 2 which is used in the conventional conveyor belt 11 is thicker than the nominal diameter of the steel cords 3. That is, the thickness t of the cushioning rubber 4 between the adjacent steel cords 3 is the maximum thickness and the volume of the cushioning rubber 4 was increased by increasing the thickness of this portion.

On the other hand, according to the present technology, it is possible to significantly reduce the volume of the cushioning rubber 4 since the thickness t2 (the maximum thickness) of the cushioning rubber 4 is reduced. Therefore, it is possible to reduce the influence of the cushioning rubber 4 for which it is difficult to adjust the value of the loss factor tanδ on the running resistance. That is, it is possible to further reduce the running resistance during belt operation even when using the cushioning rubber 4 of the conventional art. More preferably, the thickness t2 (the maximum thickness) of the cushioning rubber 4 is set to ¼ the nominal diameter of the steel cords 3.

In this embodiment, it is possible to simplify the steps of manufacturing the core layer 2 as described above due to the specification where the adjacent steel cords 3 of the core layer 2 are linked to each other by the cushioning rubber 4. Moreover, since the thickness t1 of the cushioning rubber 4 which covers the outer circumferential surfaces of the steel cords 3 is thinner than the thickness t2 of the cushioning rubber 4 between the adjacent steel cords 3, it is possible to manufacture the core layer 2 using sheet material with the fixed thickness t1. Therefore, it is possible to further simplify the steps of manufacturing the core layer 2. Furthermore, there is an advantage in manufacturing the stable core layer 2 with little variation in the thickness of the cushioning rubber 4 with high productivity.

Here, it is also possible to set a specification where the thickness t1 of the cushioning rubber 4 which covers the outer circumferential surfaces of the steel cords 3 is set to be the same as the thickness t2 of the cushioning rubber 4 between the adjacent steel cords 3 (t1≈t2). When manufacturing the core layer 2 with such a specification, for example, a sheet material having a portion where the thickness is relatively increased at intervals is prepared as the rubber which forms the cushioning rubber 4. Then, by setting the portion of the sheet material where the thickness is relatively increased to correspond to the steel cords 3, the large number of steel cords 3 aligned in parallel are interposed from above and below between the sheet materials.

According to this specification, since the thickness of the cushioning rubber 4 which functions as the adhesive rubber is constant regardless of the position, there is an advantage in achieving uniformity by reducing variations in the adhesive power between the steel cords 3 and the upper cover rubber layer 5 and the lower cover rubber layer 6.

Figure 4:
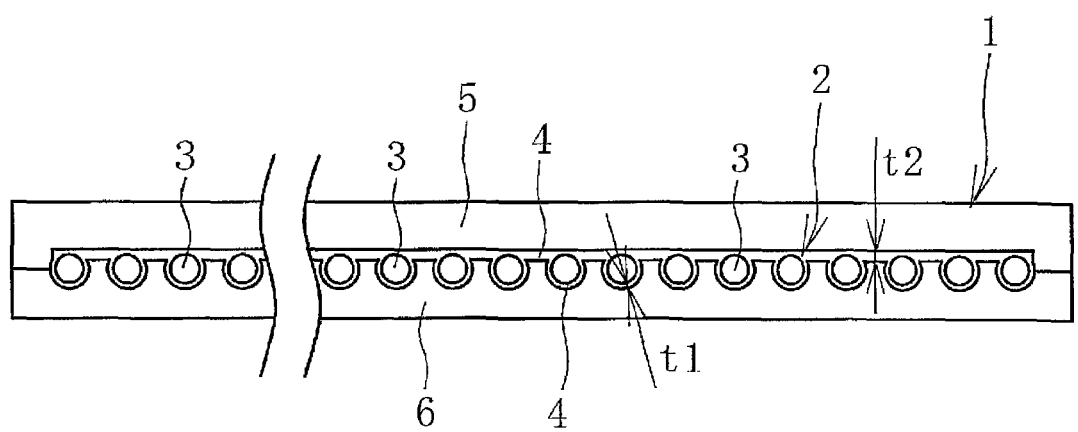
FIG. 4 is a side cross-sectional view illustrating another embodiment of a conveyor belt.

In the embodiment of the conveyor belt 1 illustrated in FIG. 4, the rubber (the low loss rubber) which forms the lower cover rubber layer 6 is interposed between the adjacent steel cords 3 without interposing the rubber which forms the upper cover rubber layer 5. In other words, the core layer 2 is configured by linking the adjacent steel cords 3 by positioning the cushioning rubber 4 at upper end portions of each of the steel cords 3 between the adjacent steel cords 3. In other respects, the configuration is the same as that of the embodiment illustrated in FIG. 2.

In the manufacturing of the core layer 2, for example, a large number of the steel cords 3 aligned in parallel are disposed on a sheet material of the cushioning rubber 4a with the thickness t1 placed on a plane. Another sheet material of the cushioning rubber 4b with the thickness t1 is disposed on this sheet material and the steel cords 3 are interposed from above and below between the sheet materials by inserting the sheet materials between the steel cords 3 along the outer circumferential surfaces of the steel cords 3.

Due to this, since the surface of the sheet material placed on the plane is flat, the rubber which forms the upper cover rubber layer 5 is disposed on this surface side and the rubber which forms the lower cover rubber layer 6 is disposed on the surface side of the surface opposite to this surface, whereby it is possible to manufacture the conveyor belt 1 by performing a normal vulcanization step after setting the core layer 2 to a state of being interposed between the upper cover rubber layer 5 and the lower cover rubber layer 6. In the case of this specification, only the low loss rubber is interposed between the adjacent steel cords 3. Therefore, there is an advantage in reducing the running resistance during belt operation since it is possible to increase the volume ratio of the low loss rubber.

Figure 5:
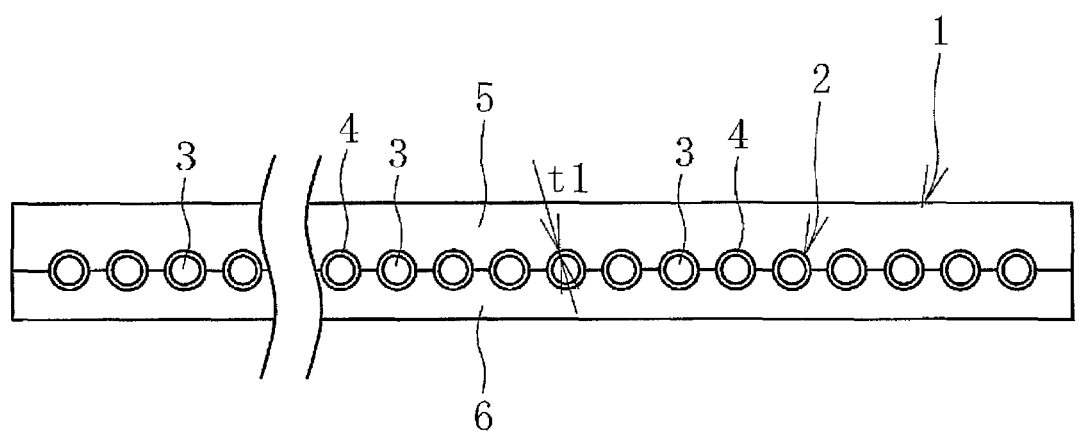
FIG. 5 is a side cross-sectional view illustrating yet another embodiment of a conveyor belt.

Yet another embodiment of the conveyor belt 1 is illustrated in FIG. 5. In this embodiment, the adjacent steel cords 3 are not linked to each other by the cushioning rubber 4. Instead, the rubbers which form the upper cover rubber layer 5 and the lower cover rubber layer 6 are interposed between the adjacent steel cords 3. In other respects, the configuration is the same as that of the embodiment illustrated in FIG. 2.

In the manufacturing of the core layer 2, the steel cords 3 of which the outer circumferential surfaces are covered by the rubber which forms the cushioning rubber 4 at the predetermined thickness t1 are set to a state of being aligned in parallel. Then, it is possible to manufacture the conveyor belt 1 by performing a normal vulcanization step after setting the core layer 2 (a parallel body of the steel cords 3 of which the outer circumferential surfaces are covered at the predetermined thickness t1) to be interposed from above and below between the rubber which forms the upper cover rubber layer 5 and the rubber which forms the lower cover rubber layer 6 respectively.

In the case of this specification, it is possible to set the volume of the cushioning rubber 4 to the minimum necessary. Furthermore, there is an increased advantage in reducing the running resistance during belt operation since the rubber (the low loss rubber) which forms the lower cover rubber layer 6 is inserted to a certain extent between the adjacent steel cords 3.

What is claimed is:

1. A conveyor belt, comprising:
    a core layer disposed between an upper cover rubber layer and a lower cover rubber layer, the core layer being configured from a plurality of steel cords covered by cushioning rubber and arranged in parallel;
    a rubber that forms the lower cover rubber layer being a low loss rubber that has a loss factor tanδ of 0.07 or less at a frequency of 10 Hz, 2% dynamic strain, and a temperature of 20° C.; and
    a maximum thickness of the cushioning rubber being not more than ⅓ a nominal diameter of the steel cords;
    wherein adjacent steel cords of the core layer are linked by the cushioning rubber and a thickness of the cushioning rubber which covers outer circumferential surfaces of the steel cords is the same as a thickness of a cushioning rubber between adjacent steel cords.

2. The conveyor belt according to claim 1, wherein a nominal diameter of the steel cords is from 2.5 mm to 12.0 mm.

* * * * *